(12) United States Patent
Gupta et al.

(10) Patent No.: US 7,219,059 B2
(45) Date of Patent: May 15, 2007

(54) AUTOMATIC PRONUNCIATION SCORING FOR LANGUAGE LEARNING (75) Inventors: Sunil K. Gupta, Edison, NJ (US); Ziyi Lu, Shanghai (CN); Fengguang Zhao, Shanghai (CN)

(73) Assignee: Lucent Technologies Inc., Murray Hill, NJ (US)

( * ) Notice: Subject to any disclaimer, the term of this patent is extended or adjusted under 35 U.S.C. 154(b) by 776 days.

(21) Appl. No.: 10/188,539

(22) Filed: Jul. 3, 2002

(65) Prior Publication Data

US 2004/0006468 A1 Jan. 8, 2004

(51) Int. Cl.
G10L 15/08 (2006.01)

(52) U.S. Cl. .................. 704/240; 704/238; 704/239

(58) Field of Classification Search ............... 434/185; 704/218, 240, 246, 270, 276
See application file for complete search history.

(56) References Cited

U.S. PATENT DOCUMENTS

| | | | | | |
|---|---|---|---|---|---|
| 4,761,815 | A | * | 8/1988 | Hitchcock | 704/253 |
| 5,440,662 | A | * | 8/1995 | Sukkar | 704/236 |
| 5,487,671 | A | * | 1/1996 | Shpiro et al. | 434/185 |
| 5,675,704 | A | * | 10/1997 | Juang et al. | 704/246 |
| 5,675,706 | A | * | 10/1997 | Lee et al. | 704/256 |
| 5,766,015 | A | * | 6/1998 | Shpiro | 434/156 |
| 5,778,341 | A | * | 7/1998 | Zeljkovic | 704/256 |
| 5,832,430 | A | * | 11/1998 | Lleida et al. | 704/256 |
| 5,857,173 | A | * | 1/1999 | Beard et al. | 704/276 |
| 6,016,470 | A | * | 1/2000 | Shu | 704/244 |
| 6,055,498 | A | * | 4/2000 | Neumeyer et al. | 704/246 |
| 6,125,345 | A | * | 9/2000 | Modi et al. | 704/240 |
| 6,138,095 | A | * | 10/2000 | Gupta et al. | 704/234 |
| 6,223,155 | B1 | * | 4/2001 | Bayya | 704/243 |
| 6,226,606 | B1 | * | 5/2001 | Acero et al. | 704/218 |
| 6,292,778 | B1 | * | 9/2001 | Sukkar | 704/256.4 |
| 6,358,055 | B1 | * | 3/2002 | Rothenberg | 434/185 |
| 6,397,185 | B1 | * | 5/2002 | Komissarchik et al. | 704/270 |
| 6,502,072 | B2 | * | 12/2002 | Jiang et al. | 704/255 |
| 6,615,170 | B1 | * | 9/2003 | Liu et al. | 704/233 |
| 6,850,885 | B2 | * | 2/2005 | Raddino et al. | 704/236 |
| 2004/0006461 | A1 | * | 1/2004 | Gupta et al. | 704/200 |

OTHER PUBLICATIONS

R.C. Rose, E. Lleida, "Speech Recognition Using Automatically Derived Acoustic Baseforms", 1997, IEEE.*
Herve Bourlard, Bart D'hoore, Jean-Marc Boite, "Optimizing Recognition and Rejection Performance in Wordspotting Systems", 1994, IEEE.*
E.Lleida, R.C. Rose, "Efficient Decoding and Training Procedures for Utterance Verification in Continuous Speech Recognition", 1996, IEEE.*

(Continued)

*Primary Examiner*—David Hudspeth
*Assistant Examiner*—E. Yen (57) ABSTRACT

A method and apparatus for generating a pronunciation score by receiving a user phrase intended to conform to a reference phrase and processing the user phrase in accordance with at least one of an articulation-scoring engine, a duration scoring engine and an intonation-scoring engine to derive thereby the pronunciation score.

16 Claims, 8 Drawing Sheets

OTHER PUBLICATIONS

Jay G. Wilpon, Lawrence R. Rabiner, Chin-Hui Lee, E.R. Goldman, "Automatic Recognition of Keywords in unconstrained Speech Using Hidden Markov Models", 1990, IEEE.*

Deb Roy, Alex Pentland, "Multimodal Adaptive Interfaces", Oct. 16, 1997, MIT Media Lab.*

S. Parthasarathy, A.E. Rosenberg, "General Phrase Speaker Verification Using Sub-Word Background Models and Likelihood-Ratio Scoring", Proc. Int. Conf. Spoken Language Processing, vol. 4, Philadelphia, Oct. 1996, pp. 2403-2406.*

Oytun Turk, Levent M. Arslan, "Pronunciation Scoring for the Hearing-Impaired", SPECOM'2004: 9th Conference, Sep. 20-22, 2004.*

Leonardo Neumeyer, Horacio Franco, Mitchel Weintraub, Patti Price, "Automatic Text-independent Pronunciation Scoring of Foreign Language Student Speech", Proc. ICSLP '96.*

S.M. Witt, S.J. Young, "Performance Measures for Phone-Level Pronunciation Teaching in CALL", STiLL—Speech Technology in Language Learning, May 25-27, 1998☐☐.*

Speech Communication 30 (2000) 83-93, "Automatic scoring of pronunciation quality," Leonardo Neumeyer, Horacio Franco, Vassilios Digalakis, Mitchel Weintraub.

Speech Communication 30 (2000) 95-108, "Phone-level pronunciation scoring and assessment for interactive language learning," S.M. Witt, S.J. Young.

Speech Communication 30 (2000) 131-143, "Teaching the pronunciation of Japanese double-mora phonemes using speech recognition technology," Goh Kawai, Keikichi Hirose.

Speech Communication 30 (2000) 146-166, "SLIM prosodic automatic tools for self-learning instruction," Rodolfo Delmonte.

Speech Technology and Research Laboratory, SRI International, "Automatic Detection of Mispronunciation for Language Instruction," Orith Ronen, Leonardo Neumeyer, and Horacio Franco.

Speech Technology and Research Laboratory, SRI International, "Automatic Pronunciation Scoring for Language Instruction," Horacio Franco, Leonardo Neumeyer, Yoon Kim and Orith Ronen.

* cited by examiner

AUTOMATIC PRONUNCIATION SCORING FOR LANGUAGE LEARNING

TECHNICAL FIELD

The invention relates generally to signal analysis devices and, more specifically, to a method and apparatus for improving the language skills of a user.

BACKGROUND OF THE INVENTION

During the past few years, there has been significant interest in developing new computer based techniques in the area of language learning. An area of significant growth has been the use of multimedia (audio, image, and video) for language learning. These approaches have mainly focused on the language comprehension aspects. In these approaches, proficiency in pronunciation is achieved through practice and self-evaluation.

Typical pronunciation scoring algorithms are based upon the phonetic segmentation of a user's speech that identifies the begin and end time of each phoneme as determined by an automatic speech recognition system.

Unfortunately, present computer based techniques do not provide sufficiently accurate scoring of several parameters useful or necessary in determining student progress. Additionally, techniques that might provide more accurate results tend to be computationally expensive in terms of processing power and cost. Other existing scoring techniques require the construction of large non-native speakers databases such that non-native students are scored in a manner that compensates for accents.

SUMMARY OF THE INVENTION

These and other deficiencies of the prior art are addressed by the present invention of a method and apparatus for pronunciation scoring that can provide meaningful feedback to identify and correct pronunciation problems quickly. The scoring techniques of the invention enable students to acquire new language skills faster by providing real-time feedback on pronunciation errors. Such a feedback helps the student focus on the key areas that need improvement, such as phoneme pronunciation, intonation, duration, overall speaking rate, and voicing.

A method for generating a pronunciation score according to one embodiment of the invention includes receiving a user phrase intended to conform to a reference phrase and processing the user phrase in accordance with an articulation-scoring engine, a duration scoring engine and an intonation-scoring engine to derive thereby the pronunciation score.

BRIEF DESCRIPTION OF THE DRAWINGS

In the drawing.

To facilitate understanding, identical reference numerals have been used, where possible, to designate identical elements that are common to the figures.

DETAILED DESCRIPTION OF THE INVENTION

The subject invention will be primarily described within the context of methods and apparatus for assisting a user learning a new language. However, it will be appreciated by those skilled in the art that the present invention is also applicable within the context of the elimination or reduction of an accent, the learning of an accent (e.g., by an actor or tourist), speech therapy and the like.

The various scoring methods and algorithms described herein are primarily directed to the following three main aspects; namely, an articulation scoring aspect, a duration scoring aspect and an intonation and voicing scoring aspect. E of the three aspects is associated with a respective scoring engine.

The articulation score is tutor-independent and is adapted to detecting mispronunciation of phonemes. The articulation score indicates how close the user's pronunciation is to a reference or native speaker pronunciation. The articulation score is relatively insensitive to normal variability in pronunciation from one utterance to another utterance for the same speaker, as well as for different speakers. The articulation score is computed at the phoneme level and aggregated to produce scores the word level and the complete user phrase.

The duration score provides feedback on the relative duration differences between the user and the reference speaker for different sounds or words in a phrase. The overall speaking rate in relation to the reference speaker also provides important information to a user.

The intonation score computes perceptually relevant differences in the intonation of the user and the reference speaker. The intonation score is tutor-dependent and provides feedback at the word and phrase level. The voicing score is also computed in a manner similar to the intonation score. The voicing score is a measure of the differences in voicing level of periodic and unvoiced components in the user's speech and the reference speaker's speech. For instance, the fricatives such as /s/ and /f/ are mainly unvoiced, vowel sounds (/a/, /e/, etc.) are mainly voiced, and voiced fricatives such as /z/, have both voiced and unvoiced components. Someone with speech disabilities may have difficulty with reproducing correct voicing for different sounds, thereby, making communication with others more difficult.

Figure 1:
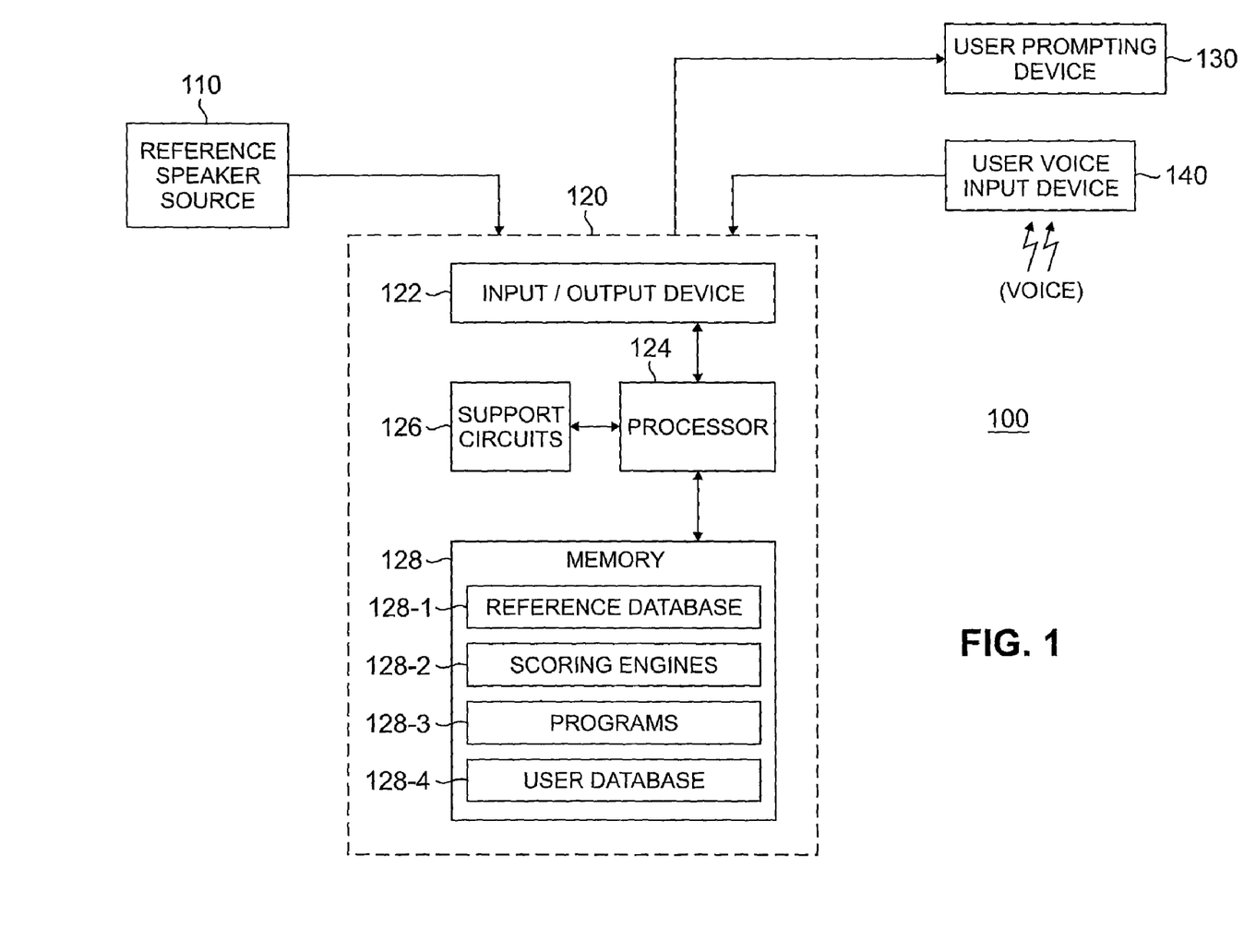
FIG. 1 depicts a high-level block diagram of a system according to an embodiment of the invention.

FIG. 1 depicts a high-level block diagram of a system according to an embodiment of the invention. Specifically, the system 100 of FIG. 1 comprises a reference speaker source 110, a controller 120, a user prompting device 130 and a user voice input device 140. It is noted that the system 100 of FIG. 1 may comprise hardware typically associated with a standard personal computer (PC) or other computing device. It is noted that the various databases and scoring engines described below may be stored locally in a user's PC, or stored remotely at a server location accessible via, for example, the Internet or other computer network.

The reference speaker source 110 comprises a live or recorded source of reference audio information. The reference audio information is subsequently stored within a reference database 128-1 within (or accessible by) the controller 120. The user-prompting device 130 comprises a device suitable for prompting a user to respond and, generally, perform tasks in accordance with the subject invention and related apparatus and methods. The user-prompting device 130 may comprise a display device having associated with it an audio presentation device (e.g., speakers). The user-prompting device is suitable for providing audio and, optionally, video or image feedback to a user. The user voice input device 140 comprises, illustratively, a microphone or other audio input device that responsively couples audio or voice input to the controller 120.

Figure 2:
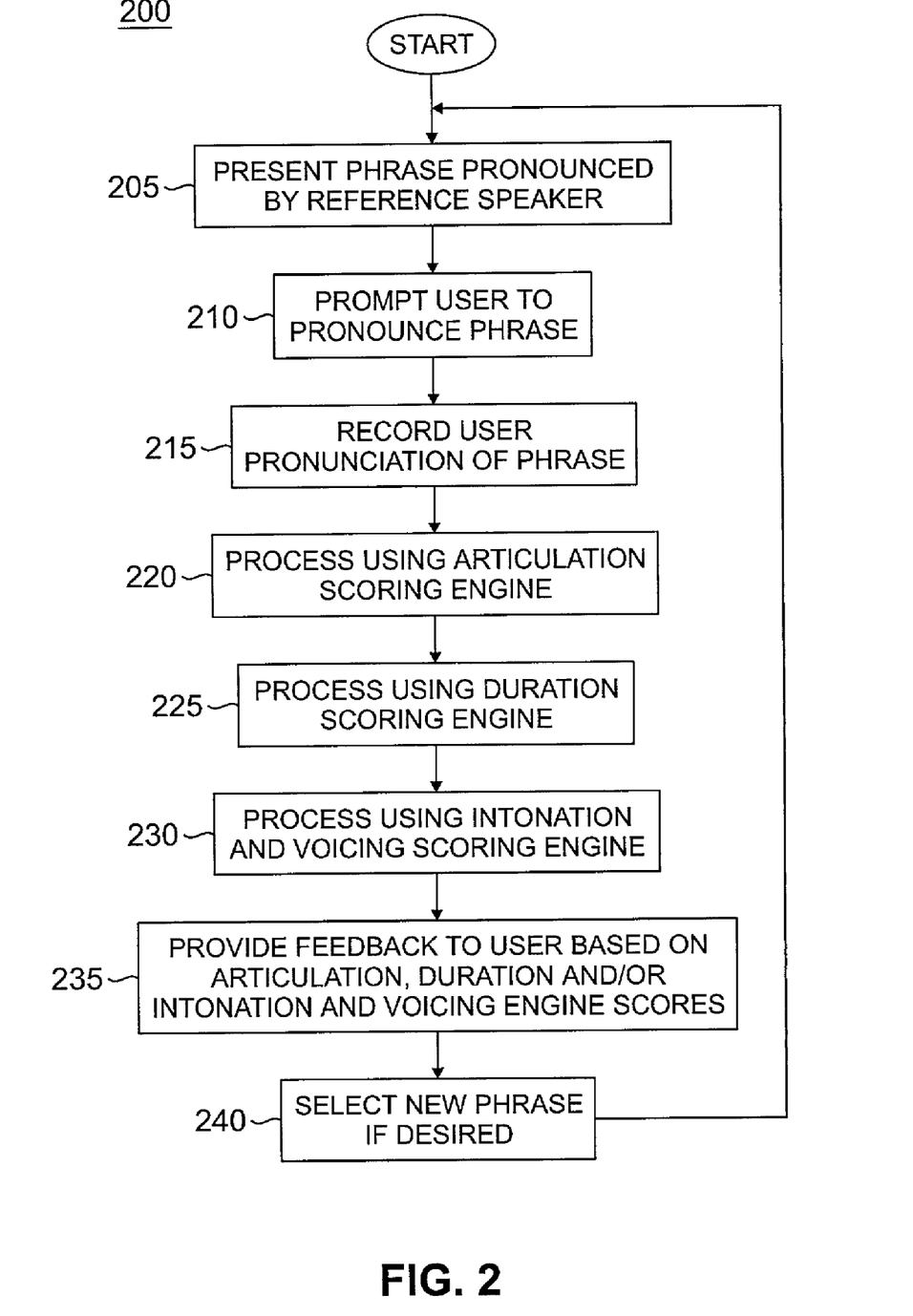
FIG. 2 depicts a flow diagram of a pronunciation scoring method according to an embodiment of the invention.

The controller 120 of FIG. 2 comprises a processor 124 as well as memory 128 for storing various control programs 128-3. The processor 124 cooperates with conventional support circuitry 126 such as power supplies, clock circuits, cache memory and the like as well as circuits that assist in executing the software routines stored in the memory 128. As such, it is contemplated that some of the process steps discussed herein as software processes may be implemented within hardware, for example as circuitry that cooperates with the processor 124 to perform various steps. The controller 120 also contains input/output (I/O) circuitry 122 that forms an interface between the various functional elements communicating with the controller 120. For example, in the embodiment of FIG. 1, the controller 120 communicates with the reference speaker source 110, user prompting device 130 and user voice input device 140.

Although the controller 120 of FIG. 2 is depicted as a general-purpose computer that is programmed to perform various control functions in accordance with the present invention, the invention can be implemented in hardware as, for example, an application specific integrated circuit (ASIC). As such, the process steps described herein are intended to be broadly interpreted as being equivalently performed by software, hardware or a combination thereof.

The memory 128 is used to store a reference database 128-1, scoring engine 128-2, control programs and other programs 128-3 and a user database 128-4. The reference database 128-1 stores audio information received from, for example, the reference speaker source 110. The audio information stored within the reference database 128-1 may also be supplied via alternate means such as a computer network (not shown) or storage device (not shown) cooperating with the controller 120. The audio information stored within the reference database 128-1 may be provided to the user-prompting device 130, which responsively presents the stored audio information to a user.

The scoring engines 128-2 comprise a plurality of scoring engines or algorithms suitable for use in the present invention. Briefly, the scoring engines 128-2 include one or more of an articulation-scoring engine, a duration scoring engine and an intonation and voicing-scoring engine. Each of these scoring engines is used to process voice or audio information provided via, for example, the user voice input device 140. Each of these scoring engines is used to correlate the audio information provided by the user to the audio information provided by a reference source to determine thereby a score indicative of such correlation. The scoring engines will be discussed in more detail below with respect to FIGS. 3–5.

The programs 128-3 stored within the memory 128 comprise various programs used to implement the functions described herein pertaining to the present invention. Such programs include those programs useful in receiving data from the reference speaker source 110 (and optionally encoding that data prior to storage), those programs useful in providing stored audio data to the user-prompting device 130, those programs useful in receiving and encoding voice information received via the user voice input device 140, those programs useful in applying input data to the scoring engines, operating the scoring engines and deriving results from the scoring engines. The user database 128-4 is useful in storing scores associated with a user, as well as voice samples provided by the user such that a historical record may be generated to show user progress in achieving a desired language skill level.

FIG. 2 depicts a flow diagram of a pronunciation scoring method according to an embodiment of the invention. Specifically, the method 200 of FIG. 2 is entered at step 205 when a phrase or word pronounced by a reference speaker is presented to a user. That is, at step 205 a phrase or word stored within the reference database 128-1 is presented to a user via the user-prompting device 130 or other presentation device.

At step 210, the user is prompted to pronounce the word or phrase previously presented either in text form or in text and voice. At step 215, the word or phrase spoken by the user in response to the prompt is recorded and, if necessary, encoded in a manner compatible with the user database 128-4 and scoring engines 128-2. For example, the recorded user pronunciation of the word or phrase may be stored as a digitized voice stream or signal or as an encoded digitized voice stream or signal.

At step 225, the stored encoded or unencoded voice stream or signal is processed using an articulation-scoring engine. At step 225, the stored encoded or unencoded voice stream or signal is processed using a duration scoring engine. At step 230, the stored encoded or unencoded voice stream or signal is processed using an intonation and voicing scoring engine. It will be appreciated by those skilled in the art that the articulation, duration and intonation/voicing scoring engines may be used individually or in any combination to achieve a respective score. Moreover, the user's voice may be processed in real-time (i.e., without storing in the user database), after storing in an unencoded fashion, after encoding, or in any combination thereof.

At step 235, feedback is provided to the user based on one or more of the articulation, duration and/or intonation and voicing engine scores. At step 240, a new phrase or word is selected, and steps 205–235 are repeated. After a predefined period of time, iterations through the loop or achieved level of scoring for one or more of the scoring engines, the method 200 is exited.

Articulation Scoring Algorithm

The articulation score is tutor-independent and is adapted to detecting phoneme level and word-level mispronunciations. The articulation score indicates how close the user's pronunciation is to a reference or native speaker pronunciation. The articulation score is relatively insensitive to normal variability in pronunciation from one utterance to another utterance for the same speaker, as well as for different speakers.

The articulation-storing algorithm computes an articulation score based upon speech templates that are derived from a speech database of native speakers only. A method to obtain speech templates is known in the art. In this approach, after obtaining segmentations by Viterbi decoding, an observation vector assigned to a particular phoneme is applied on a garbage model g (trained using, e.g., all the phonemes of the speech data combined). Thus, for each phoneme $q_i$, two scores are obtained; one is the log-likelihood score $l_q$ for $q_i$, the other is the log-likelihood score $l_g$ for garbage model g. The garbage model, also referred to as the general speech model, is a single model derived from all the speech data. By examining the difference between $l_q$ and $l_g$, a score for the current phoneme is determined. A score table indexed by the log-likelihood difference is discussed below with respect to Table 1.

Figure 3A:
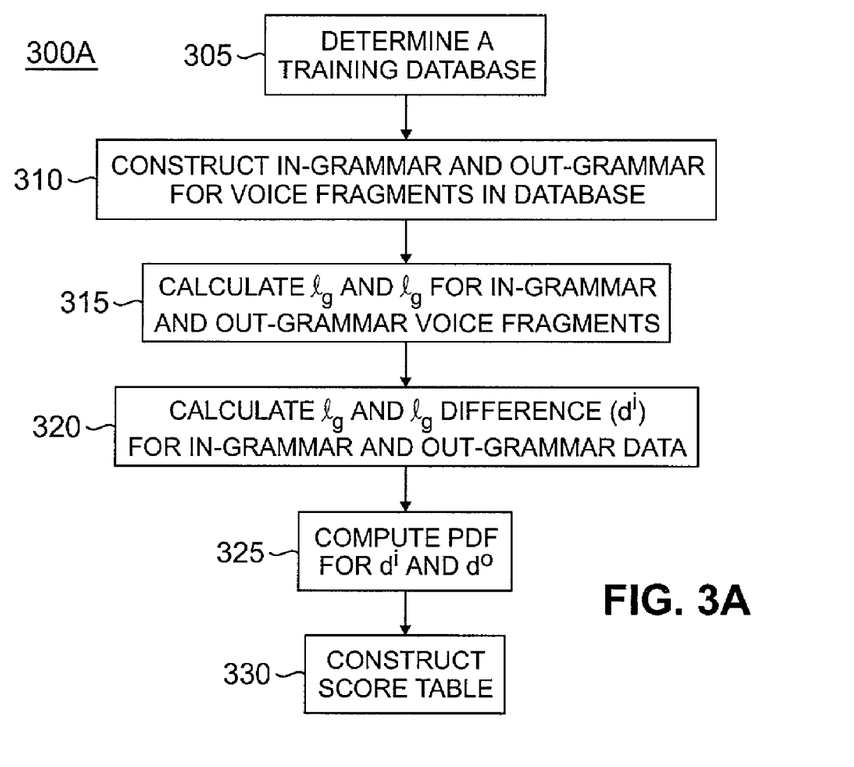
FIG. 3A depicts a flow diagram of a training method useful in deriving to a scoring table for an articulation scoring engine method.
Figure 3B:
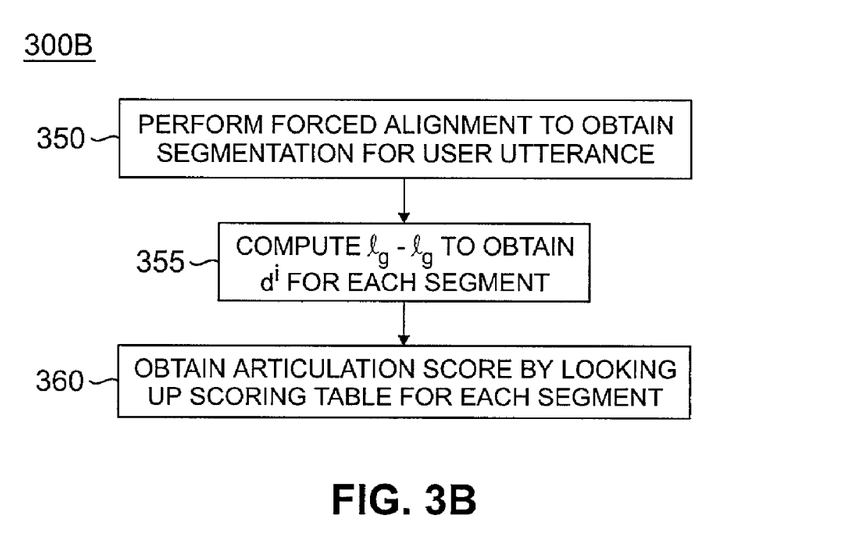
FIG. 3B depicts a flow diagram of an articulation scoring engine method suitable for use in the pronunciation scoring method of FIG. 2.

FIG. 3 depicts a flow diagram of an articulation scoring engine method suitable, for use as, for example, step 220 in the method 200 of FIG. 2. FIG. 3A depicts a flow diagram of a training method useful in deriving a scoring table for an articulation scoring engine, while FIG. 3B depicts a flow diagram of an articulation scoring engine method.

The method 300A of FIG. 3A generates a score table indexed by the log-likelihood difference between $l_q$ and $l_g$.

At step 305, a training database is determined. The training database is derived from a speech database of native speakers only (i.e., American English speakers in the case of American reference speakers).

At step 310, for each utterance, an "in-grammar" and "out-grammar" is constructed, where in-grammar is defined as conforming to the target phrase (i.e., the same as the speech) and where out-grammar is a some other randomly selected phrase in the training database randomly selected (i.e., non-conforming to the target phrase).

At step 315, $l_q$ and $l_g$ is calculated on the in-grammar and out-grammar for each utterance over the whole database. The in-grammar log-likelihood score for a phoneme q and a garbage model g are denoted as $q_q^i$ and $l_g^i$, respectively. The out-grammar log-likelihood score for q and g are denoted as $l_q^o$ and $l_g^o$, respectively.

At step 320, the $l_q$ and $l_g$ difference ($d^i$) is calculated. That is, collect the score $l_q$ and $l_g$ for individual phonemes and compute the difference. The difference between $l_q$ and $l_g$ is $d^i = l_q^i - l_g^i$, for in-grammar and $d^o = l_q^o - l_g^o$ for out-grammar log-likelihood scores. It is noted that there may be some phonemes that have the same position in the in-grammar and out-of-grammar phrases. These phonemes are removed from consideration by examining the amount of overlap, in time, of the phonemes in the in-grammar and out-of-grammar utterance.

At step 325, the probability density value for $d^i$ and $d^o$ is calculated. A Gaussian probability density function (pdf) is used to approximate the real pdf, then the two pdfs (in-grammar and out-grammar) can be expressed as $f^i = N(\mu^i, \sigma^i)$ and $f^o = N(\mu^o, \sigma^o)$, respectively.

Figure 6:
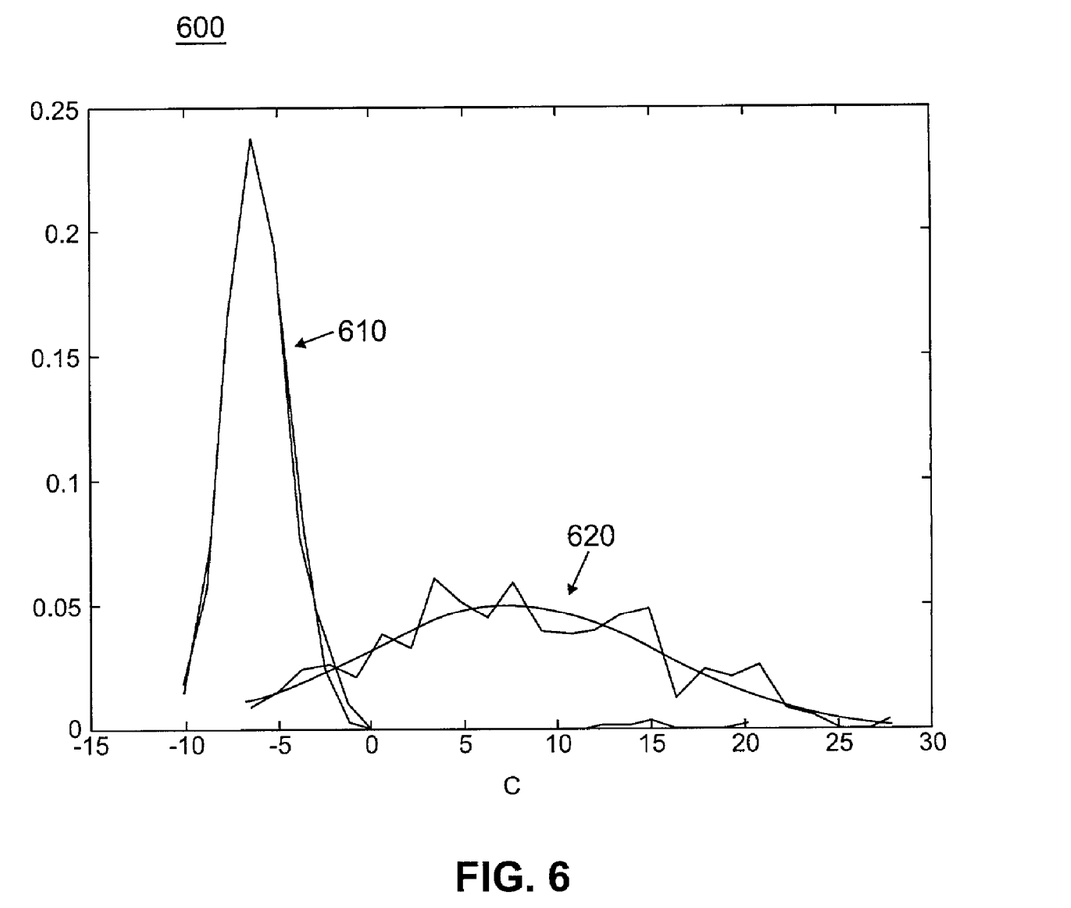
FIG. 6 graphically depicts probability density functions (pdfs) associated with a particular phoneme.

FIG. 6 graphically depicts probability density functions (pdfs) associated with a particular phoneme as a function of the difference between difference between $l_q$ and $l_g$. Specifically, FIG. 6 shows the in-grammar and out-grammar pdfs for a phoneme /C/. It is noted that the Gaussian pdf successfully approximates the actual pdf.

At step 330, a score table is constructed, such as depicted below as Table 1. The entry of the table is the difference d, the output is the score normalized in the range [0, 100]. The log-likelihood difference between the two pdfs $f^i$ and $f^o$ is defined as $h(x) = \log f^i(x) - \log f^o(x)$.

For example, assume the score at $\mu^i$ as 100, such that at this point the log-likelihood difference between $f^i$ and $f^o$ is $h(\mu^i)$. Also assume the score at $\mu^o$ as 0, such that at this point the log-likelihood difference is $h(\mu^o)$. Defining the two pdfs' cross point as C, the difference of two pdfs at this point is $h(x=C)=0$. From value $\mu^i$ to C, an acoustic scoring table is provided as:

TABLE 1

The score table for acoustic scoring.

| D | score |
|---|---|
| $\mu^i$ | 100 |
| x, sub $h(x) = \dfrac{\log \frac{90}{10}}{\log 10} h(\mu^i)$ | 90 |
| x, sub $h(x) = \dfrac{\log \frac{80}{20}}{\log 10} h(\mu^i)$ | 80 |
| x, sub $h(x) = \dfrac{\log \frac{70}{30}}{\log 10} h(\mu^i)$ | 70 |
| x, sub $h(x) = \dfrac{\log \frac{60}{70}}{\log 10} h(\mu^i)$ | 60 |
| x, sub $h(x) = 0$ | 50 |
| x, sub $h(x) = \dfrac{\log \frac{60}{40}}{\log 10} h(\mu^o)$ | 40 |
| x, sub $h(x) = \dfrac{\log \frac{70}{30}}{\log 10} h(\mu^o)$ | 30 |
| x, sub $h(x) = \dfrac{\log \frac{80}{20}}{\log 10} h(\mu^o)$ | 20 |
| x, sub $h(x) = \dfrac{\log \frac{90}{10}}{\log 10} h(\mu^o)$ | 10 |
| $\mu^o$ | 0 |

FIG. 3B depicts a flow diagram of an articulation scoring engine method suitable for use in the pronunciation scoring method of FIG. 2. Specifically, the method 300B of FIG. 3 is entered at step 350, where a forced alignment to obtain segmentation for the user utterance is performed. At step 355, the $l_q$ and $l_g$ difference ($d^i$) is calculated is calculated for each segment. At step 360, a scoring table (e.g., such as constructed using the method 300A of FIG. 3A) is used as a lookup table to obtain an articulation score for each segment.

For the example of phoneme /C/, whose pdfs are shown in FIG. 6, the score table is constructed as shown in Table 2, as follows:

TABLE 2

The score table for phoneme C

| d | score |
|---|---|
| −6.10 | 100 |
| −5.63 | 90 |
| −4.00 | 80 |
| −3.32 | 70 |
| −2.86 | 60 |
| −2.47 | 50 |
| 0.43 | 40 |
| 2.61 | 30 |
| 4.72 | 20 |
| 7.32 | 10 |
| 7.62 | 0 |

Thus, illustratively, if the grammar is . . . C . . . , the forced Viterbi decoding gives the log-likelihood difference between the in-grammar and out-grammar log-likelihood score for phoneme C as −3.00, by searching the table, we find the d lies in [−2.86, −3.32], therefore the acoustic score for this phoneme is 60.

Note that in the above example, anti-phone models that are individually constructed for each phoneme model could also replace the garbage model. The anti-phone model for a particular target phoneme may be constructed from those training speech data segments that correspond to phonemes that are most likely to be confused with the target phoneme or using methods known in the art. It should be noted that other techniques for decoding the speech utterance to obtain segmentation may be employed by a person skilled in the art.

Duration Scoring Algorithm

The duration score provides feedback on the relative duration differences between various sounds and words in the user and the reference speaker's utterance. The overall speaking rate in relation to the reference speaker also provides important information to a user.

The phoneme-level segmentation information of user's speech L and tutor's speech T from a Viterbi decoder may be denoted as $L=(L_1, L_2, \ldots, L_N)$ and $T=(T_1, T_2, \ldots, T_N)$; where N is the total number of phonemes in the sentences, $L_i$ and $T_i$ are the user's and tutor's durations corresponding to the phoneme $q_i$.

Figure 4:
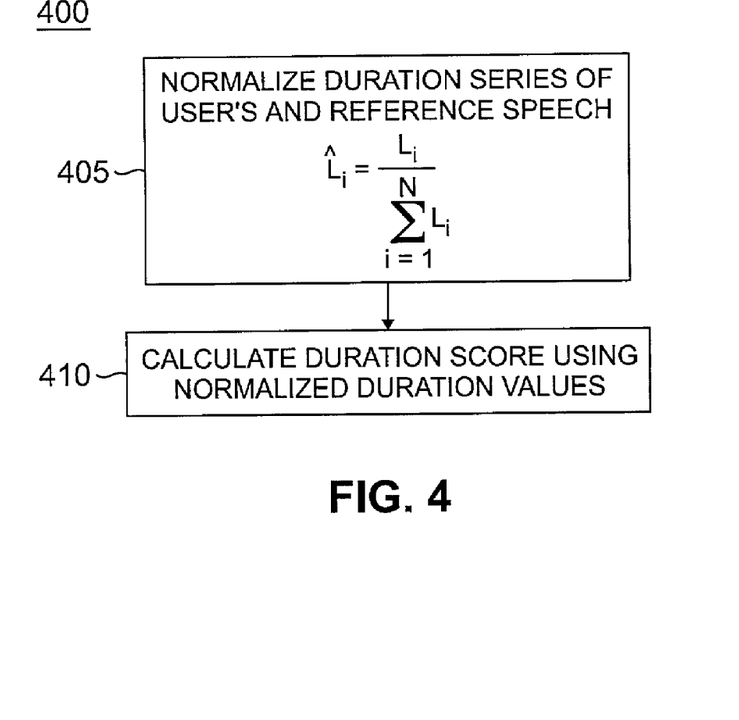
FIG. 4 depicts a flow diagram of a duration scoring engine method suitable for use in the pronunciation scoring method of FIG. 2.

FIG. 4 depicts a flow diagram of a duration scoring engine method suitable for use as, for example, step 225 in the method 200 of FIG. 2. The method 400 of FIG. 4 determines the difference in the relative duration of different phonemes between the user and the reference speech, thereby enabling a determination as to whether the user has unusually elongated certain sounds in the utterance in relation to other sounds.

At step 405, the duration series is normalized using the following equation:

$$\hat{L}_i = \frac{L_i}{\sum_{i=1}^{N} L_i}$$

$$\hat{T}_i = \frac{T_i}{\sum_{i=1}^{N} T_i}$$

At step 410, the overall duration score is calculated based on the normalized duration values, as follows:

$$D = \max\left\{0, 1 - \sum_{i=1}^{N} |\hat{L}_i - \hat{T}_i|\right\}$$

Intonation Scoring Algorithm

The intonation (and voicing) score computes perceptually relevant differences in the intonation of the user and the reference speaker. The intonation score is tutor-dependent and provides feedback at the word and phrase level. The intonation scoring method operates to compare pitch contours of reference and user speech to derive therefrom a score. The intonation score reflects stress at syllable level, word level and sentence level, intonation pattern for each utterance, and rhythm.

The smoothed pitch contours are then compared according to some perceptually relevant distance measures. Note that the details of the pitch-tracking algorithm are note important for this discussion. However, briefly, the pitch-tracking algorithm is a time domain algorithm that uses autocorrelation analysis. It first computes coarse pitch estimate in the decimated LPC residual domain. The final pitch estimate is obtained by refining the coarse estimate on the original speech signal. The pitch detection algorithm also produces an estimate of the voicing in the signal.

The algorithm is applied on both the tutor's speech and the user's speech, to obtain two pitch series P(T) and P(L), respectively.

The voicing score is computed in a manner similar to the intonation score. The voicing score is a measure of the differences in level of periodic and unvoiced components in the user's speech and the reference speaker's speech. For instance, the fricatives such as /s/ and /f/ are mainly unvoiced, vowel sounds (/a/, /e/, etc.) are mainly voiced, and voiced fricatives such as /z/, have both voiced and unvoiced components. Someone with speech disabilities may have difficulty with reproducing correct voicing for different sounds, thereby, making communication with others more difficult.

Figure 5:
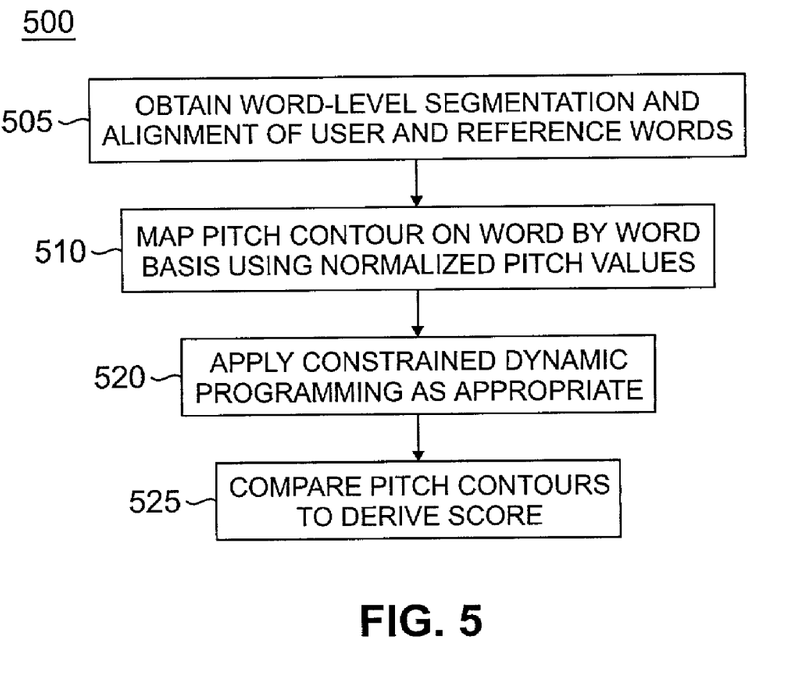
FIG. 5 depicts a flow diagram of an intonation scoring engine method suitable for use in the pronunciation scoring method of FIG. 2.

FIG. 5 depicts a flow diagram of an intonation scoring engine method suitable for use as, for example, step 230 in the method 200 of FIG. 2.

At step 505, the word-level segmentations of the user and reference phrases are obtained by, for example, a forced alignment technique. Word segmentation is used because the inventors consider pitch relatively meaningless in terms of phonemes.

At step 510, a pitch contour is mapped on a word-by-word basis using normalized pitch values. That is, the pitch contours of the user's and the tutor's speech are determined.

At step 520, constrained dynamic programming is applied as appropriate. Since the length of the tutor's pitch series is normally different from the user's pitch series, it may be necessary to normalize them. Even if the lengths of tutor's pitch series and user's are the same, there is likely to be a need for time normalizations.

At step 525, the pitch contours are compared to derive therefrom an intonation score.

For example, assume that the pitch series for a speech utterance is $P=(P_1, P_2, \ldots, P_M)$, where M is the length of pitch series, $P_i$ is the pitch period corresponding to frame i. In the exemplary embodiments, a frame is a block of speech (typically 20–30 ms) for which a pitch value is computed.

After mapping onto the word, the pitch series is obtained on a word-by-word basis, as follows: $P=(P^1, P^2, \ldots, P^N)$; and $P^i=(P_1^i, P_2^i, \ldots, P_{M_i}^i)$, $1 \leq i \leq N$; where $P^i$ is the pitch series corresponding to $i^{th}$ word, $M_i$ is the length of pitch series of $i^{th}$ word, N is the number of words within the sentence.

Optionally, a pitch-racking algorithm is applied on both the tutor and learner's speech to obtain two pitch series as follows: $P_T=(P_T^1, P_T^2, \ldots, P_T^N)$ and $P_L=(P_L^1, P_L^2, \ldots, P_L^N)$. It should be noted that even for the same $i^{th}$ word, the tutor and the learner's duration may be different such that the length of $P_T^i$ is not necessarily equal to the length of $P_L^i$. The most perceptually relevant part within the intonation is the word based pitch movements. Therefore, the word-level intonation score is determined first. That is, given the $i^{th}$ word level pitch series $P_T^i$ and $P_L^i$, the "distance" between them is measured.

For example, assume that two pitch series for a word are denoted as follows: $P_T=(T_1, T_2, \ldots, T_D)$ and $P_L=(L_1, L_2, \ldots, L_E)$, where D, E are the length of pitch series for the particular word. Since $P_T$ and $P_L$ are the pitch values corresponding to a single word, there may exist two cases; namely, (1) The pitch contours are continuous within a word such that no intra-word gap exists (i.e., no gap in the pitch contour of a word); and (2) There may be some parts of speech without pitch values within a word, thus leading gaps within pitch contour (i.e., the parts may be unvoiced phonemes like unvoiced fricatives and unvoiced stop consonants, or the parts may be voiced phonemes with little energy and/or low signal-to-Noise ratio which cannot be detected by pitch tracking algorithm).

For the second case, the method operates to remove the gaps within pitch contour and thereby make the pitch contour appear to be continuous. It is noted that such operation may produce some discontinuity at the points where the pitch contours are bridged. As such, the smoothing algorithm is preferably applied in such cases to remove these discontinuities before computing any distance.

In one embodiment of the invention, only the relative movement or comparison of pitch is considered, rather than changes or differences in absolute pitch value. In this embodiment, pitch normalizations are applied remove those pitch values equal to zero; then the mean pitch value within the word is subtracted; then a scaling is applied to the pitch contour that normalizes for the difference in the nominal pitch between the tutor and the user's speech. For instance, the nominal pitch for a male speaker is quite different from the nominal pitch for a female speaker, or a child. The scaling accounts for these differences. The average of the pitch values over the whole utterance is used to compute the scale value. Note that the scale value may also be computed by maintaining average pitch values over multiple utterances to obtain more reliable estimate of the tutor's and user's nominal pitch values. The resulting pitch contours for a word are then represented as: $\tilde{P}_T=(\tilde{T}_1, \tilde{T}_2, \ldots, \tilde{T}_{\tilde{D}})$ and $\tilde{P}_L=(\tilde{L}_1, \tilde{L}_2, \ldots, \tilde{L}_{\tilde{E}})$, where $\tilde{D}, \tilde{E}$ are the length of normalized pitch series.

Figure 7:
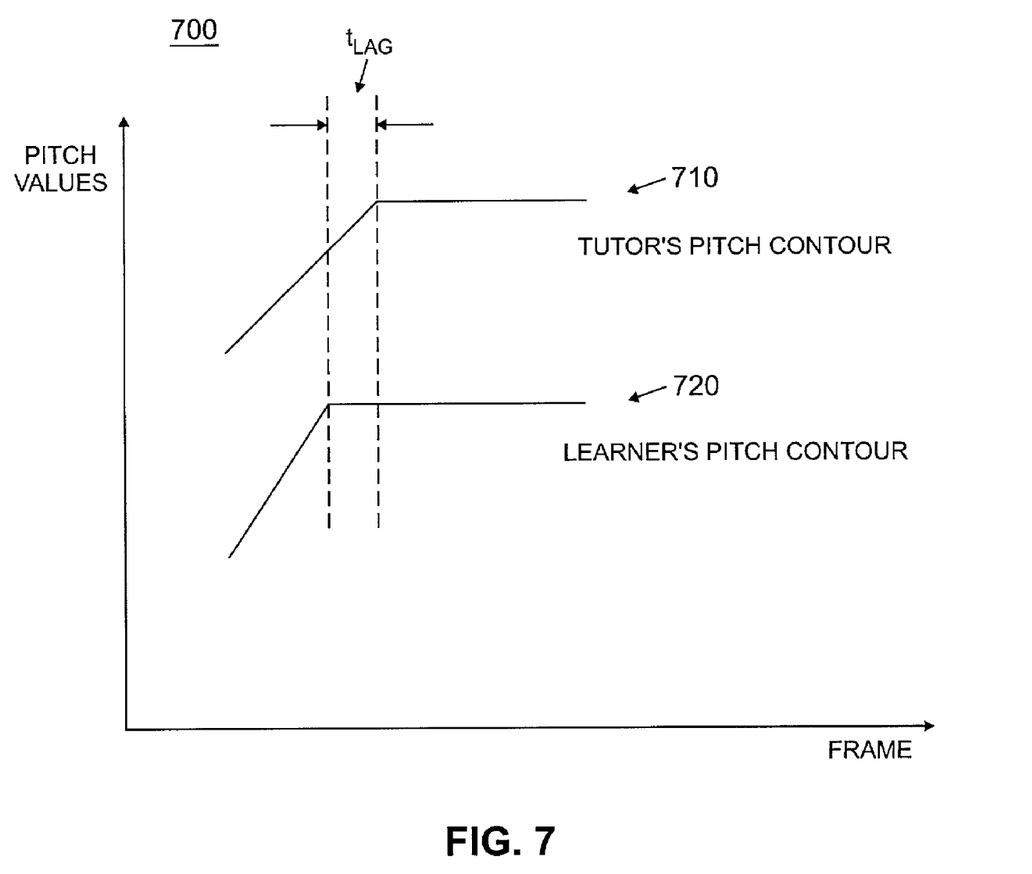
FIG. 7 graphically depicts a pitch contour comparison that benefits from time normalization in accordance with an embodiment of the invention.

FIG. 7 graphically depicts a pitch contour comparison that benefits from time normalization in accordance with an embodiment of the invention. Specifically, FIG. 7 depicts a tutor's pitch contour 710 and a learner's pitch contour 720 that are misaligned in time by a temporal amount $t_{LAG}$. It can be seen that the user or learner's intonation is quite similar to the tutor's intonation. However, due to the duration difference of phonemes within the word(s) spoken, the learner's pitch contour is not aligned with the tutor's. In this case, if the distance measure is applied directly, incorrect score will be obtained. Thus, in the case of such non-alignment, a constrained dynamic programming method is used to find the best match path between the tutor and learner's pitch series.

Figure 8:
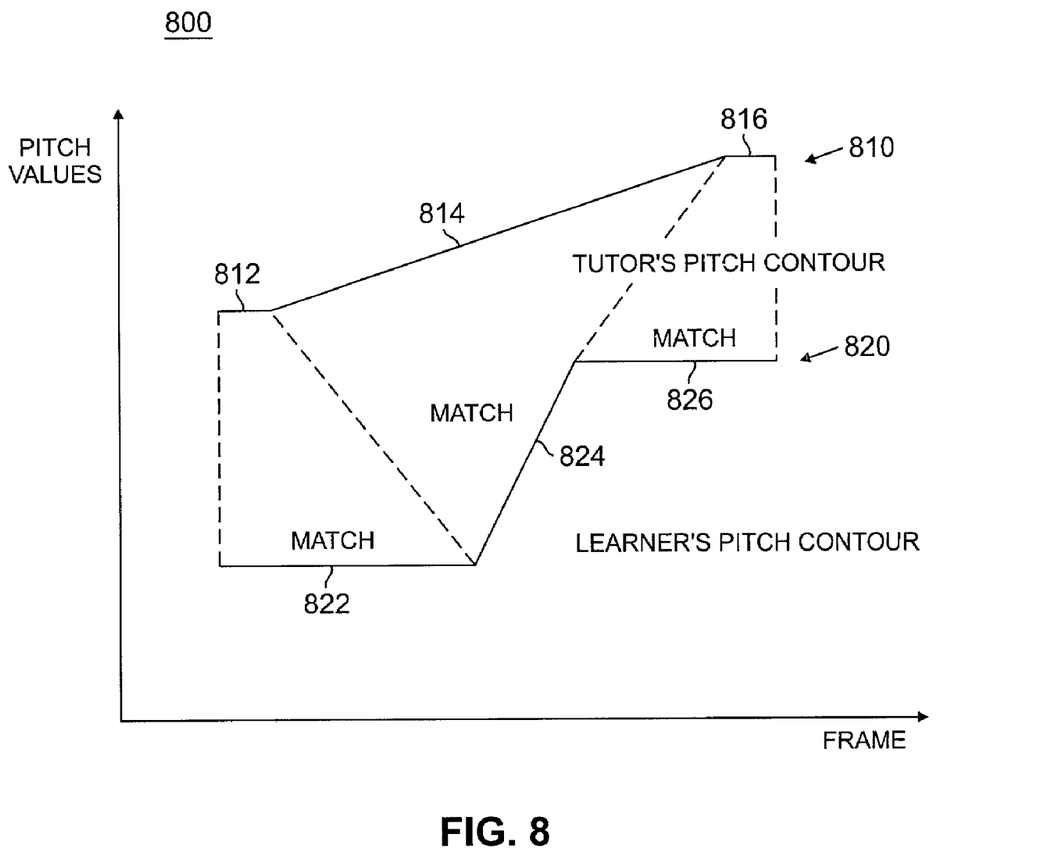
FIG. 8 graphically depicts a pitch contour comparison that benefits from constrained dynamic programming in accordance with an embodiment of the invention.

FIG. 8 graphically depicts a pitch contour comparison that benefits from constrained dynamic programming in accordance with an embodiment of the invention. Specifically, FIG. 8 depicts a tutor's pitch contour 810 and a learner's pitch contour 820 that are quite different yet still yield a relatively good score since three parts (812, 814, 816) of the tutor's pitch contour 810 are very well matched to three corresponding parts (822, 824, 826) of the learner's pitch contour 820.

The dynamic programming described herein attempts to provide a "best" match to two pitch contours. However, the may result in an unreliable score unless some constraints are applied to the dynamic programming. The constraints limit the match area of dynamic programming. In one experiment, the inventors determined that the mapping path's slope should lie within [0.5, 2]. Within the context of the dynamic programming, two warping functions are found; namely $\Phi_T$ and $\Phi_L$, which related the indices of two pitch series, $i_T$ and $i_L$, respectively. Specifically, $i_T=\Phi_T(k)$, $k=1, 2, \ldots, K$ and $i_L=\Phi_L(k)$, $k=1, 2, \ldots, K$; where k is the normalized index.

For example, assume that $\tilde{P}_T, \tilde{P}_L$ are the normalized pitch series of tutor and learner, and that $\Delta\tilde{P}_T, \Delta\tilde{P}_L$ are the first order temporal derivative of pitch series of the tutor and learner, respectively. Then the following equations are derived:

$$\tilde{P}_T=(\tilde{T}_1, \tilde{T}_2, \ldots, \tilde{T}_{\tilde{D}})$$

$$\tilde{P}_L=(\tilde{L}_1, \tilde{L}_2, \ldots, \tilde{L}_{\tilde{E}})$$

$$\Delta\tilde{P}_T=(\Delta\tilde{T}_1, \Delta\tilde{T}_2, \ldots, \Delta\tilde{T}_{\tilde{D}})$$

$$\Delta\tilde{P}_L=(\Delta\tilde{L}_1, \Delta\tilde{L}_2, \ldots, \Delta\tilde{L}_{\tilde{E}}); \text{ and}$$

$$\Delta\tilde{T}_i = \mu \sum_{k=-K}^{K} k\tilde{T}_{i+k}, 1 \leq i \leq \tilde{D}$$

$$\Delta\tilde{L}_i = \mu \sum_{k=-K}^{K} k\tilde{L}_{i+k}, 1 \leq i \leq \tilde{E}$$

The constant $\mu$ is used for the normalization and controls the weight of the delta-pitch series. While K is normally selected as 4 to compute the derivatives, other values may be selected. Dynamic programming is used to minimize the distance between the series $(\tilde{P}_T, \Delta\tilde{P}_T)$ and $(\tilde{P}_L, \Delta\tilde{P}_L)$, as follows:

$$d_\Phi = \sum_{i=1}^{K} d(\Phi_T(i), \Phi_L(i))$$

$d=(\tilde{T}_i-\tilde{L}_i)^2+(\Delta\tilde{T}_i-\Delta\tilde{L}_i)^2$ is the Euclidean distance between two normalized vector $(\tilde{T}_i, \Delta\tilde{T}_i)$ and $(\tilde{L}_i, \Delta\tilde{L}_i)$ at time i. It is contemplated by the inventor that other distance measurements may also be used to practice various embodiments of the invention.

The last intonation score is determined as:

$$S = 1 - 0.5 \times \frac{d_\Phi}{d_T + d_L};$$

where $d_T = \sum_{i=1}^{K} (\tilde{T}_i)^2 + (\Delta \tilde{T}_i)^2$ and $d_L = \sum_{i=1}^{K} (\tilde{L}_i)^2 + (\Delta \tilde{L}_i)^2$

EXAMPLE

Figure 9A:
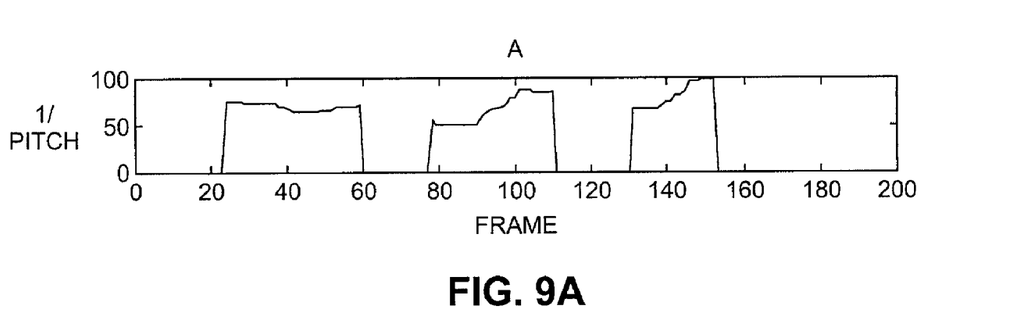
FIGS. 9A–9C graphically depict respective pitch contours of different pronunciations of a common phrase.
Figure 9B:
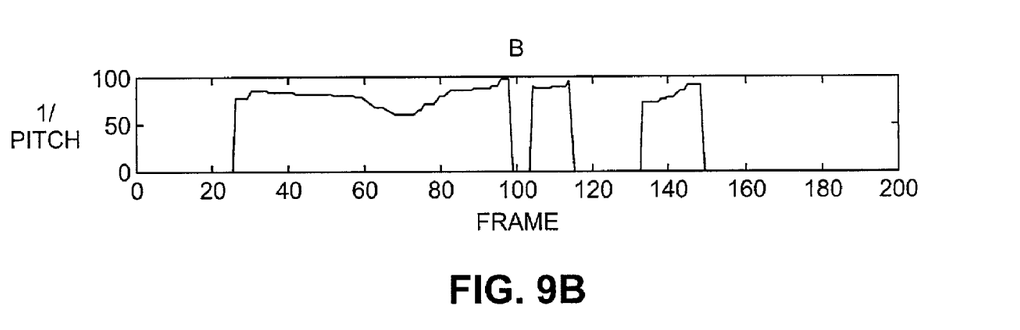
Figure 9C:
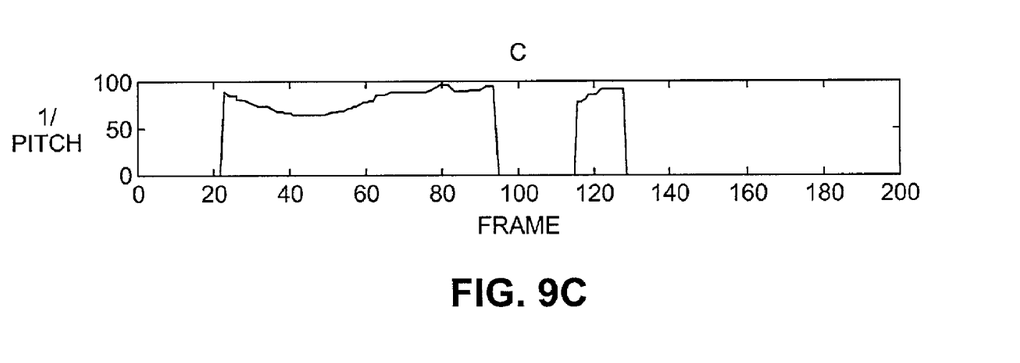

FIGS. 9A–9C graphically depicts respective pitch contours of different pronunciations of a common phrase. Specifically, the same sentence ("my name is steve") with different intonation was repeated by a reference speaker and by three different users to provide respective pitch contour data.

A first pitch contour is depicted in FIG. 9A for the sentence 'my name IS steve' in which emphasis is places on the word "is" by the speaker.

A second pitch contour is depicted in FIG. 9A for the sentence 'my NAME is steve' in which emphasis is places on the word "name" by the speaker.

A third pitch contour is depicted in FIG. 9A for the sentence 'MY name is steve' in which emphasis is places on the word "my" by the speaker.

The tutor's pitch series for these three different intonations are denoted as $T^i$, i=1, 2, 3. Three different non-native speakers were asked to read the sentences following tutor's different intonations. Each reader is requested to repeat 7 times for each phrase, giving 21 utterances per speaker, denoted as $U_k^i$, i=1, 2, 3 represents different intonations, k=1, 2, ..., 7 is the utterance index. There are four words in sentence 'my name is steve', thus one reader actually produce 21 different intonations for each word. Taking $T^1$, $T^2$, $T^3$ as tutor, we can get four word-level intonation score and one overall score on these 21 sentences. The experiment is executed as follows:

To compare the automatic score and the human-being expert score, the pitch contour of these 21 sentences is compared with the tutor's pitch contour $T^1$, $T^2$, $T^3$. The reader's intonation is labeled as 'good', 'reasonable' and 'bad', where 'good' means perfect match between user's and tutor's intonations, 'bad' is poor match between them, and 'reasonable' lies within 'good' and 'bad'. Perform the scoring algorithm discussed above on these 21 sentences, obtaining the scores for class 'good', 'not bad' and 'bad'.

The scoring algorithms and method described herein produce reliable and consistent scores that have perceptual relevance. They each focus on different aspects of pronunciation in a relatively orthogonal manner. This allows a user to focus on improving either the articulation problems, or the intonation problems, or the duration issues in isolation or together. These algorithms are computationally very simple and therefore can be implemented on very low-power processors. The methods and algorithms have been implemented on an ARM7 (74 MHz) series processor to run in real-time.

Although various embodiments that incorporate the teachings of the present invention have been shown and described in detail herein, those skilled in the art can readily devise many other varied embodiments that still incorporate these teachings.

What is claimed is:

1. A method for generating a pronunciation score, comprising:

receiving a user phrase intended to conform to a reference phrase; and processing said user phrase in accordance with an articulation-scoring engine, a duration scoring engine and an intonation-scoring engine to derive thereby said pronunciation score, wherein the articulation-scoring engine is adapted for:

computing a plurality of segment differences between log-likelihood scores for each of a plurality of phoneme segments in said user phase and each of a plurality of corresponding phoneme segments in said reference phrase; and obtaining an articulation score for each phoneme, the articulation scores adapted for determining the pronunciation score, the articulation scores obtained according to the segment differences using an acoustic scoring table constracted by a method comprising:

constructing a plurality of phrase conforming phonemes and randomly selected phonemes using voice fragments from a training database;

computing a log-likelihood difference for each phoneme of the phrase conforming phonemes;

computing a log-likelihood difference for each phoneme of the randomly selected phonemes;

calculating a probability density function for the phrase conforming phonemes using the log-likelihood differences computed for the phrase conforming phonemes;

calculating a probability density function for the randomly selected phonemes using the log-likelihood differences computed for the randomly selected phonemes; and constructing the acoustic scoring table by associating the probability density functions with a scoring range.

2. The method of claim 1, wherein said articulation scoring engine is further adapted for:

performing a forced alignment to obtain phoneme segmentation for identifying the plurality of phoneme segments in the user phrase and the plurality of corresponding phoneme segments in the reference phrase.

3. The method of claim 1, wherein said scoring table provides scores having a normalized range, wherein said normalized range is determined using a first peak associated with the probability density function for the phrase conforming phonemes and a second peak associated with the probability density function for the randomly selected phonemes.

4. The method of claim 1, wherein said duration engine comprises:

determining the difference in the relative duration of corresponding phonemes in the user and the reference phrases and deriving therefrom a score.

5. The method of claim 4, wherein said duration difference is calculated by comparing a normalized duration series for each of a plurality of words within said user phrase to corresponding words within said reference phrase.

6. The method of claim 5, wherein said normalized duration series D for a phoneme is described by the equation:

$$D = \max\left\{0, 1 - \sum_{i=1}^{N} |L_i - T_i|\right\};$$

where N is the total number of phonemes in a phrase, $L_i$ is the normalized duration series for the user phrase and $T_i$ is the normalized duration series for the reference phrase.

7. The method of claim 1, wherein said intonation scoring engine comprises:
obtaining word level segmentation and alignment of user and reference words forming said respective user and reference phrases;
deriving pitch contours for said user and reference segments; and
comparing said pitch contours to derive therefrom a score.

8. The method of claim 7, further comprising:
applying a dynamic programming constraint to at least one of said user and reference pitch contours.

9. The method of claim 8, wherein said dynamic programming constraint comprises a temporal delay.

10. The method of claim 8, wherein said dynamic programming constraint comprises a pitch tracking algorithm.

11. The method of claim 8, wherein said dynamic programming constraint comprises a removal of intra-word pitch contour gaps.

12. The method of claim 1, wherein said pronunciation score is generated within an interactive system in which said user phrase is provided in response to the presentation of said reference phrase.

13. The method of claim 12, wherein a plurality of pronunciation scores are obtained in an iterative manner to track thereby improvements in user pronunciation of said reference phrase.

14. The method of claim 13, further comprising providing additional reference phrases for use in said interactive system.

15. A computer readable medium for storing instructions that, when executed by a processor, perform a method for generating a pronunciation score, comprising:
receiving a user phrase intended to conform to a reference phrase; and
processing said user phrase in accordance with an articulation-scoring engine, a duration scoring engine and an intonation-scoring engine to derive thereby said pronunciation score, wherein the articulation-scoring engine is adapted for:
computing a plurality of segment differences between log-likelihood scores for each of a plurality of phoneme segments in said user phrase and each of a plurality of corresponding phoneme segments in said reference phrase; and
obtaining an articulation score for each phoneme, the articulation scores adapted for determining the pronunciation score, the articulation scores obtained according to the segment differences using an acoustic scoring table constructed by a method comprising:
constructing a plurality of phrase conforming phonemes and randomly selected phonemes using voice fragments from a training database;
computing a log-likelihood difference for each phoneme of the phrase conforming phonemes;
computing a log-likelihood difference for each phoneme of the randomly selected phonemes;
calculating a probability density function for the phrase conforming phonemes using the log-likelihood differences computed for the phrase conforming phonemes;
calculating a probability density function for the randomly selected phonemes using the log-likelihood differences computed for the randomly selected phonemes; and
constructing the acoustic scoring table by associating the probability density functions with a scoring range.

16. Apparatus for generating a pronunciation score, comprising:
means for receiving a user phrase intended to conform to a reference phrase; and
means for processing said user phrase in accordance with an articulation-scoring engine, a duration scoring engine and an intonation-scoring engine to derive thereby said pronunciation score, wherein the articulation-scoring engine comprises:
means for computing a plurality of segment differences between log-likelihood scores for each of a plurality of phoneme segments in said user phrase and each of a plurality of corresponding phoneme segments in said reference phrase; and
means for obtaining an articulation score for each phoneme, the articulation scores adapted for determining the pronunciation score, the articulation scores obtained according to the segment differences using an acoustic scoring table constructed using:
means for constructing a plurality of phrase conforming phonemes and randomly selected phonemes using voice fragments from a training database;
means for computing a log-likelihood difference for each phoneme of the phrase conforming phonemes;
means for computing a log-likelihood difference for each phoneme of the randomly selected phonemes;
means for calculating a probability density function for the phrase conforming phonemes using the log-likelihood differences computed for the phrase conforming phonemes;
means for calculating a probability density function for the randomly selected phonemes using the log-likelihood differences computed for the randomly selected phonemes; and
means for constructing the acoustic scoring table by associating the probability density functions with a scoring range.

* * * * *